(12) United States Patent
Kinomura et al.

(10) Patent No.: US 11,840,199 B2
(45) Date of Patent: Dec. 12, 2023

(54) CHARGING FACILITY AND CONTROL METHOD OF CHARGING FACILITY

(71) Applicant: TOYOTA JIDOSHA KABUSHIKI KAISHA, Aichi-ken (JP)

(72) Inventors: Shigeki Kinomura, Toyata (JP); Yoshiyuki Tsuchiya, Nagoya (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 132 days.

(21) Appl. No.: 17/715,955

(22) Filed: Apr. 8, 2022

(65) Prior Publication Data

US 2022/0388482 A1 Dec. 8, 2022

(30) Foreign Application Priority Data

Jun. 2, 2021 (JP) .................. 2021-092847

(51) Int. Cl.
  *B60S 1/08* (2006.01)
  *B60L 53/14* (2019.01)
  *B60L 53/60* (2019.01)
  *B60S 1/38* (2006.01)

(52) U.S. Cl.
  CPC ............ *B60S 1/0822* (2013.01); *B60L 53/14* (2019.02); *B60L 53/60* (2019.02); *B60S 1/38* (2013.01)

(58) Field of Classification Search
  CPC .......... B60S 1/0822; B60S 1/38; B60L 53/14; B60L 53/60; B60L 53/31; Y02T 10/70; Y02T 10/7072; Y02T 90/12
  See application file for complete search history.

(56) References Cited

U.S. PATENT DOCUMENTS

| 11,479,135 | B2* | 10/2022 | Price | B60L 53/305 |
| 2013/0307477 | A1* | 11/2013 | Reinschke | B60L 53/30 320/109 |
| 2020/0324661 | A1* | 10/2020 | Freeling-Wilkinson | B60L 53/30 |
| 2021/0053456 | A1* | 2/2021 | Freeling-Wilkinson | B60L 53/14 |
| 2021/0252989 | A1* | 8/2021 | Price | B60L 53/31 |
| 2021/0387538 | A1* | 12/2021 | Wheatley | H02S 40/10 |
| 2022/0305932 | A1* | 9/2022 | Kinomura | H02J 7/0042 |

FOREIGN PATENT DOCUMENTS

| JP | 2011-109807 A | 6/2011 |
| JP | 5475407 B2 | 4/2014 |

* cited by examiner

*Primary Examiner* — An T Nguyen

(74) *Attorney, Agent, or Firm* — HAUPTMAN HAM, LLP

(57) ABSTRACT

A control device executes a process including a step of determining whether a first state is established, a step of acquiring an operating state of a wiper of a surrounding vehicle when the first state is determined to be established, a step of determining whether rainfall of which rainfall amount is equal to or more than a predetermined amount is predicted, and a step of executing elevating control when the rainfall of which rainfall amount is equal to or more than the predetermined amount is predicted.

4 Claims, 8 Drawing Sheets

CHARGING FACILITY AND CONTROL METHOD OF CHARGING FACILITY

CROSS-REFERENCE TO RELATED APPLICATION

This application claims priority to Japanese Patent Application No. 2021-092847 filed on Jun. 2, 2021, incorporated herein by reference in its entirety.

BACKGROUND

1. Technical Field

The present disclosure relates to control of a movable charging facility for charging an on-board power storage device.

2. Description of Related Art

A charging facility for charging a power storage device mounted on a vehicle or the like is installed in the parking lot or sidewalk outside the vehicle. However, the charging facility occupies the installation space, and therefore may interfere with walking or traveling of the vehicle. Therefore, a technique for making the charging facility movable and storing the charging facility underground, for example, is known.

For example, Japanese Unexamined Patent Application Publication No. 2011-109807 (JP 2011-109807 A) discloses a charging pole that can be elevated from the ground and can be lowered so as to be stored underground.

SUMMARY

When the movable charging facility that can be elevated and lowered as described above is not used, the charging facility is stored underground. Therefore, there is a possibility that the charging facility is submerged by rainfall of which rainfall amount is large, such as sudden heavy downpour or a typhoon.

The present disclosure has been made to solve the above-mentioned issue, and an object thereof is to provide a charging facility and a control method of the charging facility that suppress submersion due to rainfall.

A charging facility according to an aspect of the present disclosure is a movable charging facility that is installed in a recess provided on a ground and is able to charge a power storage device mounted on a vehicle. The charging facility includes: a movable portion including a connecting device that is connectable to the power storage device; an elevating device that elevates and lowers the movable portion such that any of a plurality of states is established, the states including a first state in which the movable portion is stored underground and a second state in which the movable portion is exposed on the ground; an information acquisition device that acquires information related to rainfall at an installation point of the charging facility; and a control device that controls an operation of the elevating device. The control device controls the elevating device such that the second state is established when a rainfall amount is predicted to be equal to or more than a predetermined amount at the installation point using the information.

With this configuration, when the rainfall amount equal to or more than the predetermined rainfall amount is predicted at the installation point of the charging facility, the elevating device is controlled such that the second state is established. Therefore, even when rainfall of which rainfall amount is large such as a sudden heavy downpour or a typhoon occurs, submersion of the charging facility can be suppressed.

In an embodiment, the information acquisition device acquires information on an operating state of a wiper device from the vehicle within a predetermined range centered on the installation point.

With this configuration, when the information on the operating state of the wiper device of the vehicle within the predetermined range is acquired, it is possible to predict the rainfall amount equal to or more than the predetermined amount at the installation point based on the operating amount of the wiper device, for example.

Further, in an embodiment, the information acquisition device acquires information indicating a detection result by a rainwater sensor of the vehicle within a predetermined range centered on the installation point.

With this configuration, when the information indicating the detection result of the rainwater sensor of the vehicle within the predetermined range is acquired, it is possible to predict the rainfall amount equal to or more than the predetermined amount at the installation point based on the detected rainfall amount, for example.

Further, in an embodiment, the control device controls the elevating device such that the second state is established and requests another charging facility for elevating the movable portion of the other charging facility, when the rainfall amount is predicted to be equal to or more than the predetermined amount at the installation point using the information.

With this configuration, in addition to the charging facility at the installation point, submersion of the other charging facility can be suppressed.

A control method of a charging facility according to another aspect of the present disclosure is a control method of a movable charging facility that is installed in a recess provided on a ground and is able to charge a power storage device mounted on a vehicle. The charging facility includes a movable portion including a connecting device that is connectable to the power storage device, and an elevating device that elevates and lowers the movable portion such that any of a plurality of states is established, the states including a first state in which the movable portion is stored underground and a second state in which the movable portion is exposed on the ground. The control method includes: a step of acquiring information related to rainfall at an installation point of the charging facility; and a step of controlling the elevating device such that the second state is established when a rainfall amount is predicted to be equal to or more than a predetermined amount at the installation point using the information.

According to the present disclosure, a charging facility and a control method of the charging facility that suppress submersion due to rainfall can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
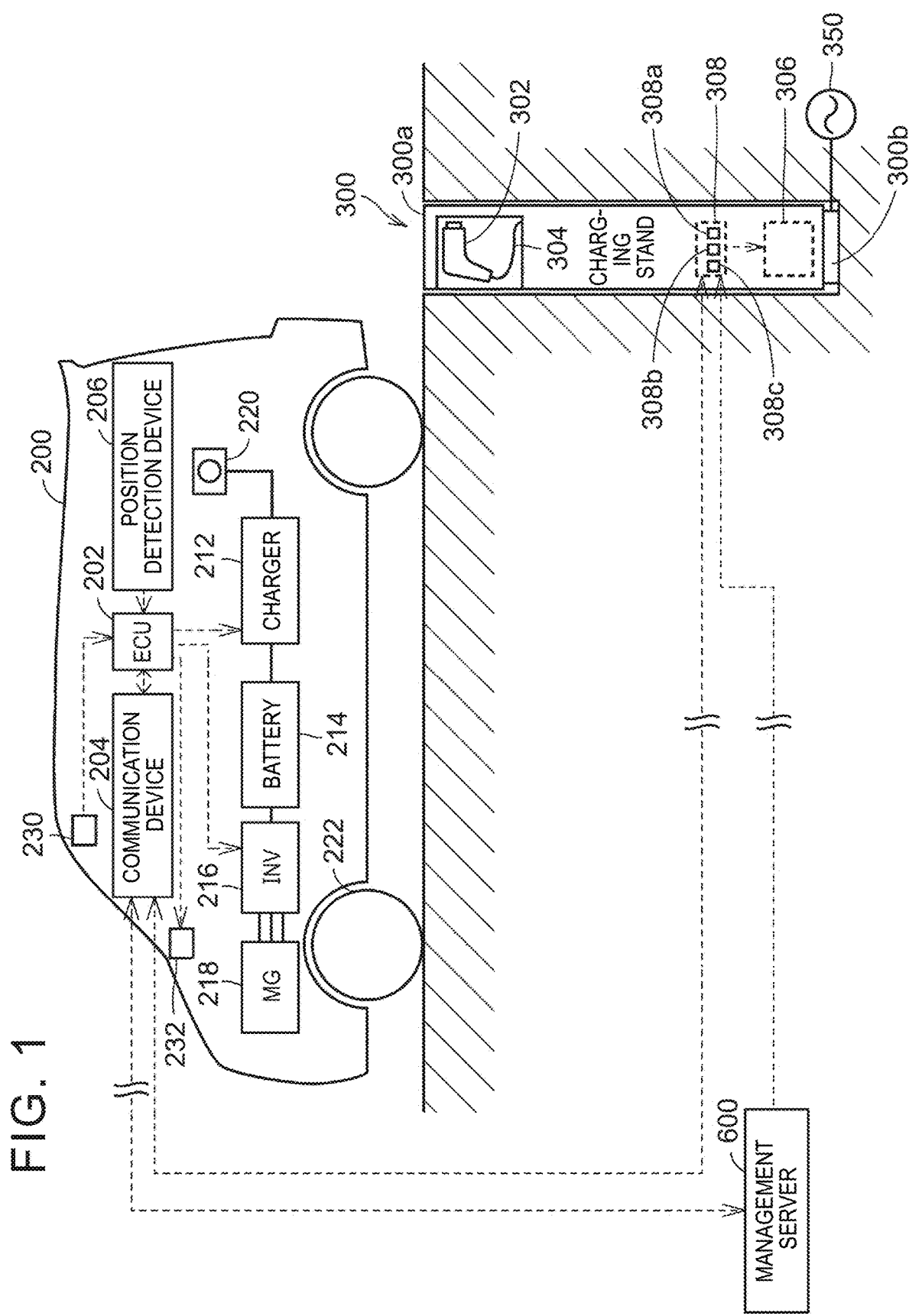
FIG. 1 is a diagram showing an example of a configuration of an electrified vehicle and a charging stand in a state where a movable portion is stored underground.

Hereinafter, an embodiment of the present disclosure will be described in detail with reference to the drawings. In the drawings, the same or corresponding portions are denoted by the same reference signs and the description thereof will not be repeated.

Figure 2:
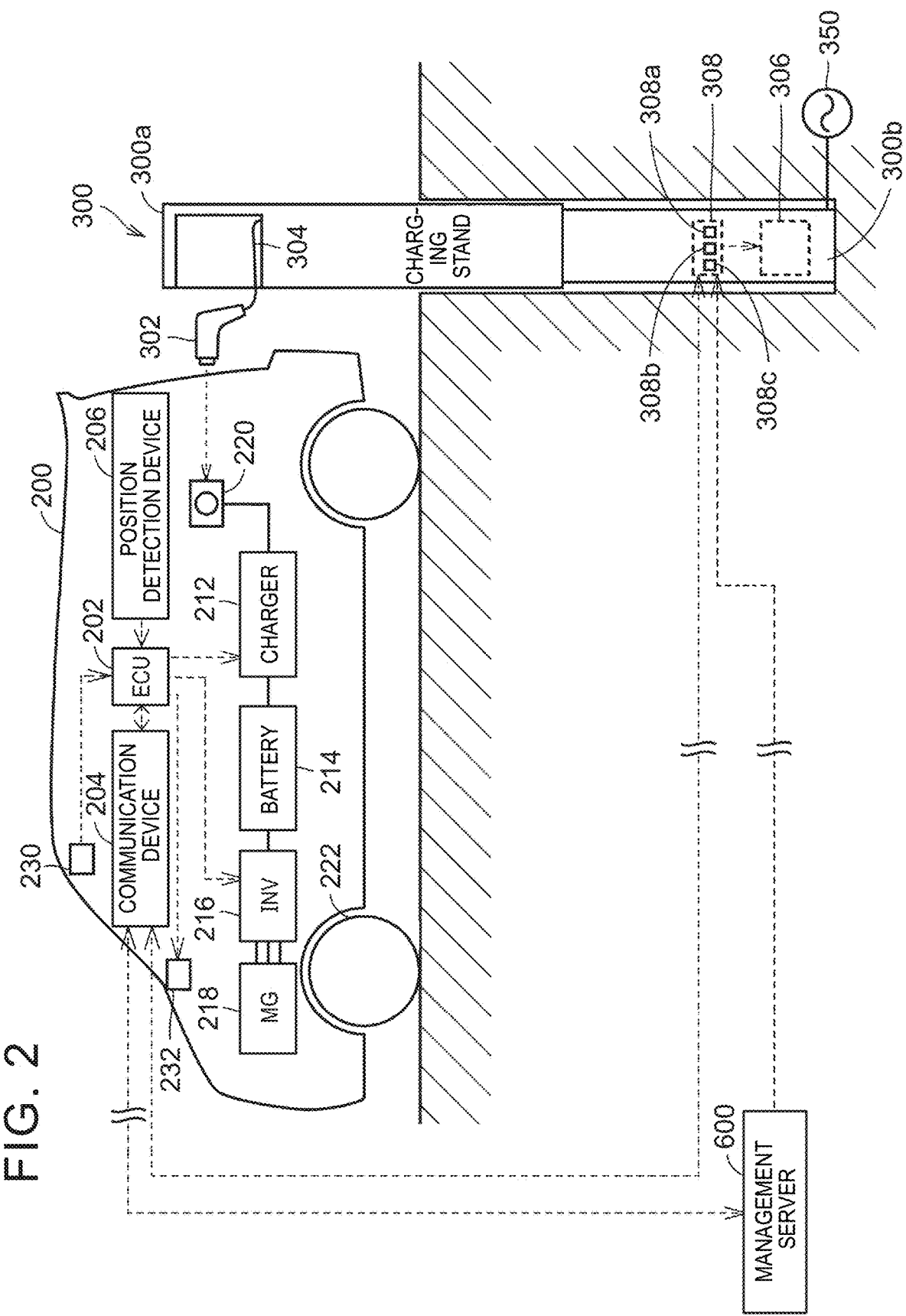
FIG. 2 is a diagram showing an example of the configuration of the electrified vehicle and the charging stand in a state where the movable portion is exposed on the ground.

Hereinafter, a configuration of a charging stand 300 that is a charging facility according to the embodiment of the present disclosure will be described as an example. FIG. 1 is a diagram showing an example of a configuration of an electrified vehicle 200 and the charging stand 300 in a state where a movable portion 300a (that will be described later) is stored underground. FIG. 2 is a diagram showing an example of the configuration of the electrified vehicle 200 and the charging stand 300 in a state where the movable portion 300a is exposed on the ground.

As shown in FIGS. 1 and 2, an upper end of the charging stand 300 is substantially flush with the ground. The charging stand 300 is configured such that the charging stand 300 can be elevated and lowered between a first state (see FIG. 1) in which the movable portion 300a is stored underground and a second state (see FIG. 2) in which the upper end is elevated to a predetermined position on the ground and the movable portion 300a is exposed on the ground.

The charging stand 300 includes, for example, a cylindrical housing and is installed on the bottom surface of a recess provided on the ground. The recess on the ground is provided so as to have a predetermined gap with an outer peripheral surface of the housing of the charging stand 300 and such that the depth is about the same as the vertical length of the charging stand 300 in the first state.

The charging stand 300 includes the movable portion 300a and a fixing portion 300b. A storage space capable of storing a connector 302 is provided in the upper portion of the movable portion 300a. One end of a cable 304 is connected to the connector 302, and the other end of the cable 304 is connected to a power source 350. The power source 350 is, for example, an alternate power (AC) power source configured by a commercial power source or the like. The cable 304 includes, for example, a shape extensible portion provided with a curl portion or a structural extensible portion provided with a reeling structure. The cable 304 is configured to be extensible to an inlet 220 of the electrified vehicle 200 parked in the parking space when the connector 302 is taken out.

The fixing portion 300b is fixed to the bottom surface of the recess provided on the ground. Note that, the fixing portion 300b is not particularly limited to being fixed to the bottom surface of the recess, as long as the fixing portion 300b is fixed to any portion in the recess provided on the ground.

The fixing portion 300b includes an elevating device 306 that elevates and lowers the movable portion 300a in an up-down direction, and a control device 308 that controls the operation of the elevating device 306.

The elevating device 306 may include, for example, a rack and pinion type mechanism that elevates and lowers the movable portion 300a by rotating a pinion gear meshed with a rack gear fixed to the movable portion 300a using an electric actuator, may include a mechanism using a hydraulic cylinder that elevates and lowers the movable portion 300a by fixing a rod connected to a piston to the movable portion 300a and increasing or decreasing the hydraulic pressure supplied to a cylinder body fixed to the fixing portion 300b, or may include a mechanism that elevates and lowers the movable portion 300a by generating a repulsive force caused by a magnetic force between the movable portion 300a and the fixing portion 300b.

The elevating device 306 raises and lowers the movable portion 300a such that the charging stand 300 is in any of a plurality of states including the first state and the second state. In the present embodiment, the elevating device 306 is configured such that the movable portion 300a is not lowered beyond the position corresponding to the first state by, for example, a stopper mechanism or the like, and is not elevated beyond the position corresponding to the second state.

The control device 308 includes a central processing unit (CPU) 308a, a memory 308b composed of a read only memory (ROM), a random access memory (ROM), and the like, and a communication unit 308c capable of communicating with an external device. The control device 308 controls an electric device (for example, the elevating device 306) provided in the charging stand 300 based on information stored in the memory 308b, information received via the communication unit 308c, and information acquired from the sensors. Note that, the controls above are not limited to the configuration in which the process executed by the software is executed by the CPU 300a, and the configuration may be constructed by the dedicated hardware (electronic circuit).

The communication unit 308c is configured to be capable of communicating various types of information and the like with an external device of the charging stand 300. The communication unit 308c is configured to be communicable with, for example, a management server 600. Further, the communication unit 308c is configured to be communicable with, for example, a communication device 204 of the electrified vehicle 200. Note that, the communication unit 308c may be configured to be communicable with a mobile terminal (not shown) owned by a user who operates charging at the charging stand 300, or another charging stand 300 in addition to the management server 600.

The communication unit 308c may be configured to be communicable with the management server 600 or another charging stand 300 by, for example, wired communication. Alternatively, the communication unit 308c may be configured to be able to communicate with the management server 600, the communication device 204, the mobile terminal, or another charging stand 300 by wireless communication, for example. The communication unit 308c may be built in the control device 308 or may be provided separately from the control device 308.

For example, when an execution condition of elevating control is satisfied, the control device 308 executes the elevating control on the elevating device 306 such that the charging stand 300 is switched from the first state to the second state. The execution condition of the elevating control includes, for example, a condition that the charging stand 300 is in the first state and a condition that an elevating request of the charging stand 300 is made. The elevating request may be received from, for example, the management server 600, the mobile terminal, or another charging stand 300.

For example, when an execution condition of lowering control is satisfied, the control device 308 executes the lowering control on the elevating device 306 such that the charging stand 300 is switched from the second state to the first state. The execution condition of the lowering control includes, for example, a condition that the charging stand 300 is in the second state and a condition that a lowering request of the charging stand 300 is made. The lowering request may be received from, for example, the management server 600, the mobile terminal, or another charging stand 300.

FIGS. 1 and 2 further show an example of the configuration of the electrified vehicle 200 parked in a parking space where the electrified vehicle 200 can be charged by the charging stand 300. As shown in FIGS. 1 and 2, the electrified vehicle 200 includes, for example, a vehicle equipped with a power storage device such as a plug-in hybrid electric vehicle and a battery electric vehicle. Note that, the configuration of the electrified vehicle 200 is not limited to the vehicles listed above, as long as the electrified vehicle 200 has a configuration capable of receiving supply of electric power from the charging stand 300, and the electrified vehicle 200 is not particularly limited to the vehicles listed above. For example, the electrified vehicle 200 may be a vehicle equipped with a power storage device for external power supply.

The electrified vehicle 200 includes an electronic control unit (ECU) 202, the communication device 204, a position detection device 206, a charger 212, a battery 214, an inverter 216, a motor generator 218, the inlet 220, a rainwater sensor 230, and a wiper device 232.

The ECU 202 includes a CPU and a memory composed of a ROM, RAM, and the like. The ECU 202 controls an electric device (for example, the communication device 204 or the wiper device 232) provided in the electrified vehicle 200 based on information stored in the memory and information acquired from the sensors (for example, the position detection device 206 and the rainwater sensor 230 that will be described later).

The communication device 204 is configured to be capable of communicating various types of information and the like with an external device of the electrified vehicle 200. The communication device 204 is configured to be communicable with, for example, the management server 600 and also communicable with the charging stand 300. Note that, the communication device 204 may be configured to be communicable with the mobile terminal.

For example, the position detection device 206 acquires the current location of the electrified vehicle 200 based on a signal (radio wave) from a global positioning system (GPS) satellite, and outputs a signal (position information) indicating the current location of the electrified vehicle 200 to the ECU 202. Note that, a method of acquiring the current location of the electrified vehicle 200 may be a method of acquiring the current location using a satellite or the like capable of detecting the position other than a GPS satellite, or a method of acquiring the current location by exchanging predetermined information with a mobile base station or an access point of wireless local area network (LAN).

When the AC power is supplied from the inlet 220, the charger 212 converts the supplied AC power into direct current (DC) power and supplies the converted DC power to the battery 214. The battery 214 is charged by operating the charger 212. The charger 212 is controlled by, for example, a control signal from the ECU 202 of the electrified vehicle 200.

The battery 214 is, for example, a rechargeable energy storage element, typically a secondary battery such as a nickel metal hydride battery or a lithium ion battery containing a liquid or solid electrolyte. Alternatively, the battery 214 may be any power storage device capable of storing electric power, and for example, a large-capacity capacitor may be used instead of the battery 214.

The inverter 216 converts, for example, the DC power of the battery 214 into the AC power and supplies the converted AC power to the motor generator 218. Further, the inverter 216 converts, for example, the AC power (regenerative power) from the motor generator 218 into the DC power and supplies the converted DC power to the battery 214 to charge the battery 214.

The motor generator 218 receives electric power from the inverter 216 and applies a rotational force to drive wheels 222. The drive wheels 222 are each rotated by a rotational force applied by the motor generator 218 to drive the electrified vehicle 200.

The inlet 220 is provided on the exterior portion of the electrified vehicle 200 together with a cover (not shown) such as a lid. The inlet 220 is a power receiving unit that receives charging power from an external charging facility (for example, the charging stand 300). The inlet 220 has a shape to which the connector 302 of the charging stand 300 can be attached. A contact is included in each of the inlet 220 and the connector 302. When the connector 302 is attached to the inlet 220, the contacts come into contact with each other, and the inlet 220 and the connector 302 are electrically connected. At this time, the battery 214 of the electrified vehicle 200 is in a state where the battery 214 can be charged using the electric power supplied from the charging stand 300.

The rainwater sensor 230 detects the amount of water droplets (rainfall amount) when the water droplets adhere to the windshield. The rainwater sensor 230 transmits a signal indicating the detected rainfall amount to the ECU 202.

The wiper device 232 includes, for example, a wiper blade provided in contact with the windshield and a wiper motor (both not shown) operating the wiper blade within a predetermined wiping range of the windshield. The wiper device 232 operates the wiper blade using the wiper motor in response to the control signal from the ECU 202 to wipe off the water droplets adhering to the predetermined wiping range. The ECU 202 operates the wiper device 232 in an operation mode in accordance with the rainfall amount detected by the rainwater sensor 230, for example. The operation mode includes, for example, a high-speed mode in which the wiper blade is operated at the maximum speed, a low-speed mode in which the wiper blade is operated at a lower speed than the high-speed mode, and an intermittent mode in which the wiper blade is operated at a predetermined time interval, or a time interval in accordance with the rainfall amount. Note that, the operation mode of the wiper device 232 can be manually selected by operating an operating member (not shown).

Figure 3:
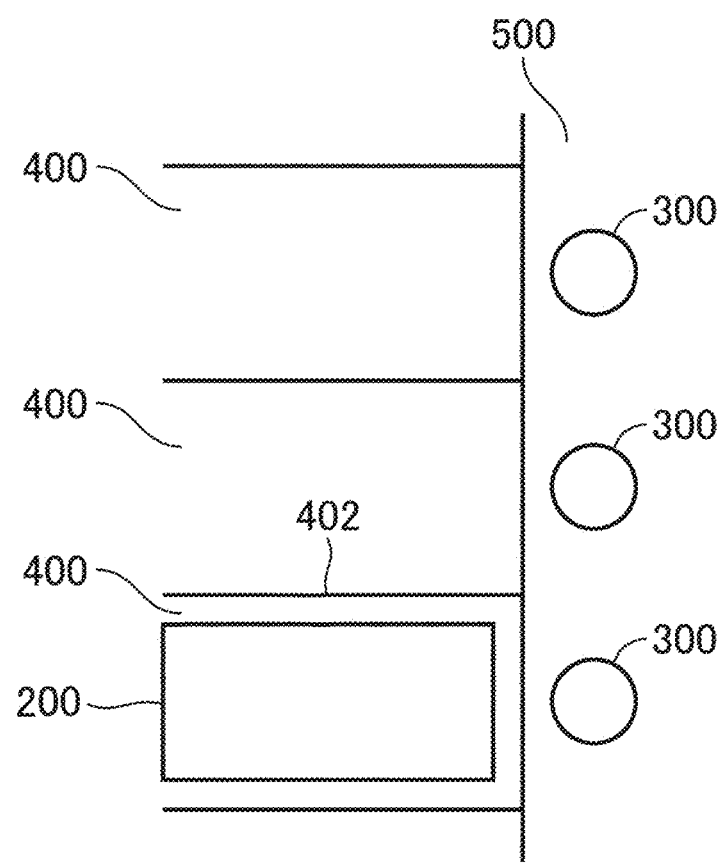
FIG. 3 is a diagram showing an example of the layout of the charging stands and parking spaces.

The charging stand 300 may be installed on a sidewalk adjacent to a plurality of parking spaces in a parking lot, a sidewalk adjacent to a plurality of parking spaces set on a road, or the like. FIG. 3 is a diagram showing an example of the layout of the charging stands 300 and parking spaces 400. As shown in FIG. 3, when the parking spaces 400 are set side by side by partition lines 402 in the parking lot, the charging stand 300 is installed at a position adjacent to each parking space 400. FIG. 3 shows, as an example, a configuration in which a sidewalk 500 is provided at one ends of the parking spaces 400 in the longitudinal direction (on the right side in FIG. 3). In this case, the charging stands 300 are installed along the sidewalk 500. When the electrified vehicle 200 is parked in any of the parking spaces 400 and the charging stand 300 is in the second state, the user takes out the connector 302 from the charging stand 300 and connects the connector 302 to the inlet 220 of the electrified vehicle 200.

Figure 4:
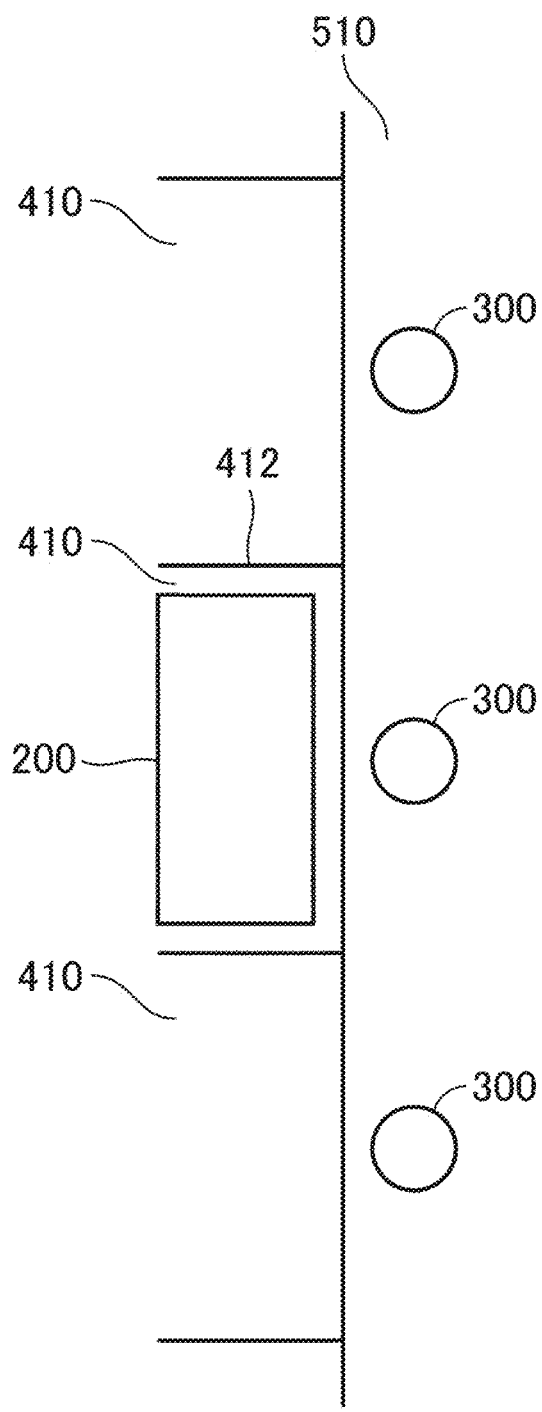
FIG. 4 is a diagram showing an example of the layout of the charging stands and the parking spaces.

FIG. 4 is a diagram showing an example of the layout of the charging stands 300 and parking spaces 410. As shown in FIG. 4, when the parking spaces 410 are set side by side by partition lines 412 in the parking lot, the charging stand 300 is installed at a position adjacent to each parking space 410. FIG. 4 shows, as an example, a configuration in which the parking spaces 410 are set along a sidewalk 510. In this case, the charging stands 300 will be installed along the sidewalk 510. When the electrified vehicle 200 is parked in any of the parking spaces 410 and the charging stand 300 is in the second state, the user takes out the connector 302 from the nearest charging stand 300 and connects the connector 302 to the inlet 220 of the electrified vehicle 200.

Note that, when the charging stand 300 is in the first state, the user may transmit the elevating request to the charging stand 300 using a mobile terminal, or may transmit the elevating request to the charging stand 300 via the management server. The control device 308 of the charging stand 300 controls the elevating device 306 such that the charging stand 300 is in the second state by receiving the elevating request.

Figure 5:
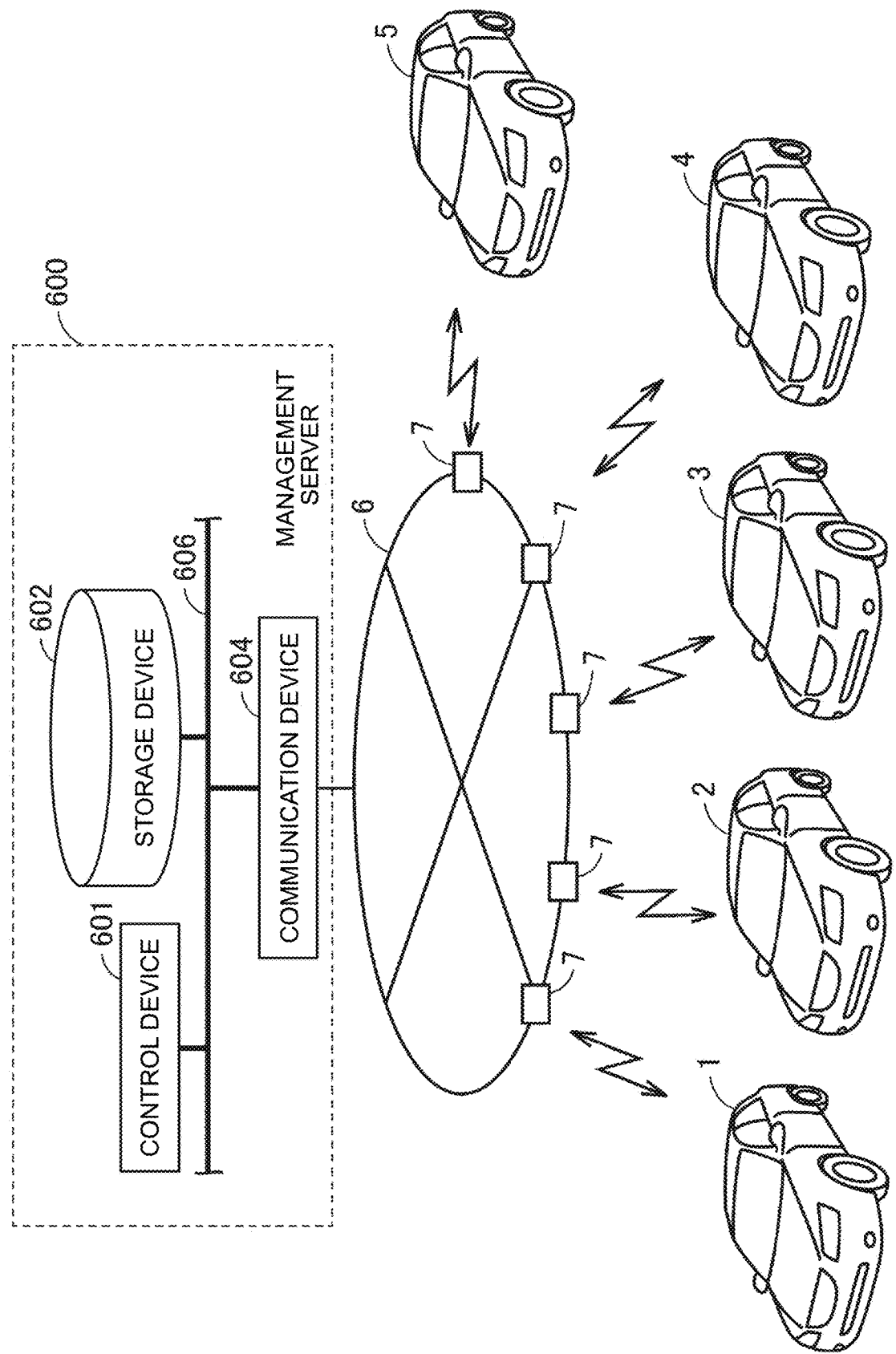
FIG. 5 is a diagram for explaining communication between a management server and a plurality of vehicles.

The management server 600 is configured to be communicable with a plurality of vehicles. FIG. 5 is a diagram for explaining communication between the management server 600 and a plurality of vehicles 1, 2, 3, 4, 5. It is assumed that the vehicles 1, 2, 3, 4, 5 have the same configuration as that of the electrified vehicle 200, for example. Therefore, the detailed description of the configuration of each vehicle will not be repeated. Further, in FIG. 5, the case where the management server 600 communicates with five vehicles is described as an example. However, the number of vehicles communicable with the management server 600 is not particularly limited to five.

As shown in FIG. 5, the management server 600 includes a control device 601, a communication device 604, and a storage device 602. The control device 601 is composed of a CPU, a memory, and the like. The communication device 604 is configured to be communicable with the vehicles 1, 2, 3, 4, 5 via a communication network 6 and base stations 7. Although not particularly shown, the communication device 604 is communicably connected to the charging stand 300 or other devices such as a mobile terminal via the communication network 6 and the base stations 7 in addition to the vehicles 1, 2, 3, 4, 5. The storage device 602 stores predetermined information. The control device 601 receives the predetermined information from the electrified vehicle 200, the vehicles 1, 2, 3, 4, 5, and the charging stand 300 described above via the communication device 604, the communication network 6, and the base stations 7 and stores a part or all of the received information in the storage device 602.

The management server 600 acquires the predetermined information from, for example, the vehicles 1, 2, 3, 4, 5. The predetermined information acquired from the vehicles 1, 2, 3, 4, 5 includes, for example, position information of each vehicle and information related to the operating state of the wiper device 232 of each vehicle. The information related to the operating state of the wiper device 232 includes information indicating whether the wiper device 232 is operating in any of the operation modes (the high-speed mode, the low-speed mode, the intermittent mode and the like described above), in addition to information indicating whether the wiper device 232 is operating. The management server 600 stores the predetermined information acquired from each vehicle in the storage device 602.

Further, the management server 600 is configured to access to an external server of the Japan Meteorological Agency (not shown) via the communication device 604 so as to acquire information such as Automated Meteorological Data Acquisition System (AMeDAS) observation data periodically provided by the Japan Meteorological Agency, for example. The management server 600 stores the acquired information in the storage device 602. The information acquired from the external server or the like includes, for example, information related to rainfall around the installation points of a plurality of charging stands (including the charging stand 300) managed by the management server 600. The information acquired from the external server or the like includes, for example, information related to whether it is raining around the installation point of the charging stand 300.

When the movable charging stand 300 that can be elevated and lowered as described above is not used, the charging stand 300 is stored in the recess provided underground. Therefore, there is a possibility that the charging stand 300 is submerged by rainfall of which rainfall amount is large, such as sudden heavy downpour or a typhoon.

Therefore, in the present embodiment, when the control device 308 of the charging stand 300 acquires information related to rainfall at the installation point of the charging stand 300 using the communication unit 308c, and predicts the rainfall amount to be a predetermined rainfall amount or more at the installation point of the charging stand 300 using the acquired information, the control device 308 controls the elevating device 306 to establish the second state.

With this configuration, when the rainfall amount equal to or more than the predetermined rainfall amount is predicted at the installation point of the charging stand 300, the elevating device 306 is controlled such that the charging stand 300 is in the second state. Therefore, even when rainfall of which rainfall amount is large such as a sudden heavy downpour or a typhoon occurs, submersion of the charging facility can be suppressed.

In the present embodiment, the control device 308 uses the communication unit 308c to acquires information on the operating state of the wiper device of the vehicle within a predetermined range centered on the installation point of the charging stand 300 as the information related to rainfall at the installation point of the charging stand 300.

Figure 6:
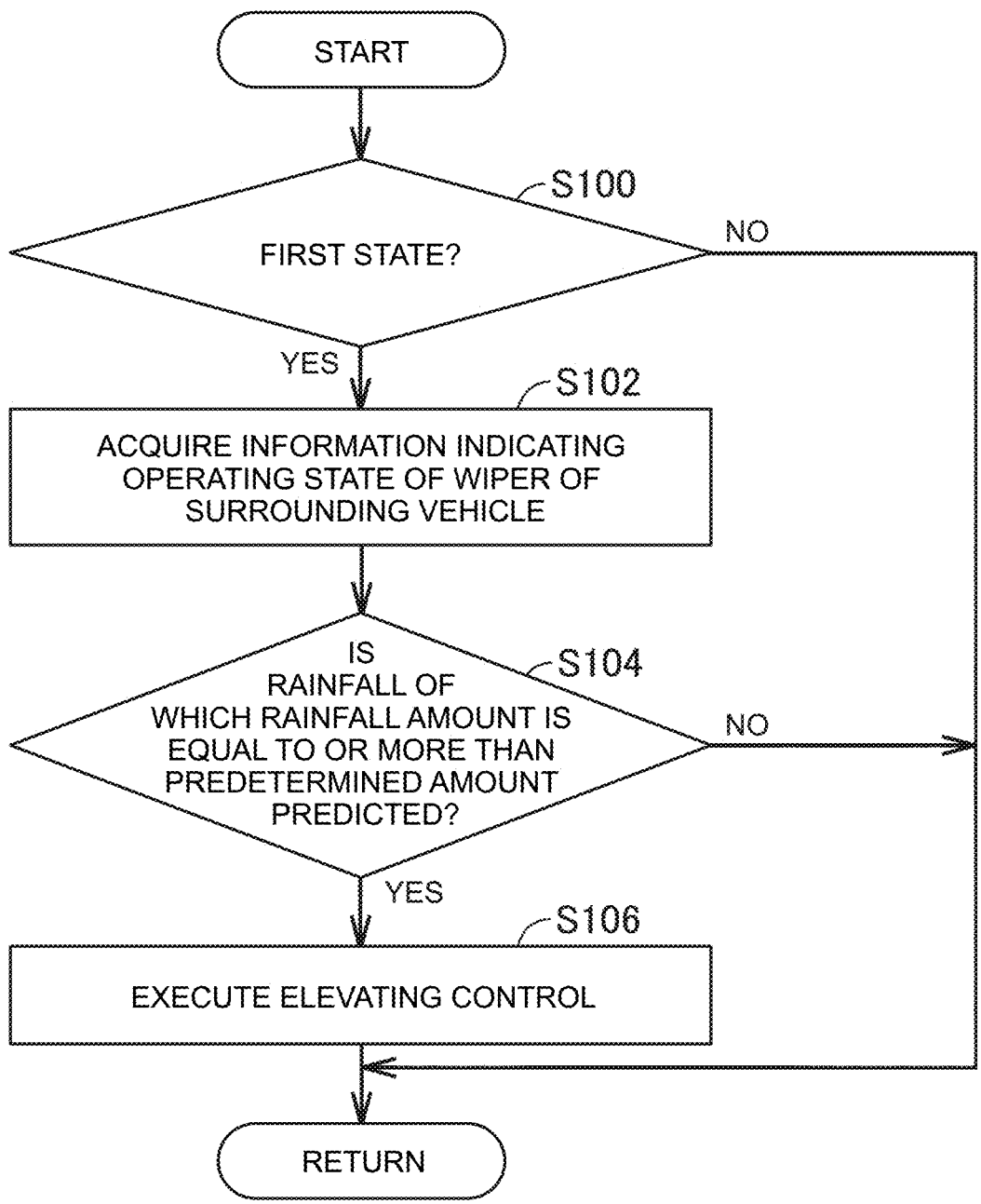
FIG. 6 is a flowchart showing an example of a process executed by a control device.

Hereinafter, an example of a control process executed by the control device 308 will be described with reference to FIG. 6. FIG. 6 is a flowchart showing an example of a process executed by the control device 308. The series of processes shown in this flowchart are repeatedly executed by the control device 308 at predetermined control cycles.

In step (hereinafter step will be referred to as S) 100, the control device 308 determines whether the charging stand 300 is in the first state. The control device 308 determines that the charging stand 300 is in the first state when an elevating flag is in an OFF state. The elevating flag is set to an ON state when the elevating control is executed, and is set to the OFF state when the lowering control is executed.

When the control device 308 determines that the charging stand 300 is in the first state (YES in S100), the process proceeds to S102.

In S102, the control device 308 acquires the operating state of the wiper device of the surrounding vehicle. The control device 308 requests, for example, the management server 600 for information indicating the operating state of the wiper device of the vehicle around the installation point of the charging stand 300.

When the management server 600 receives the request for the information from the charging stand 300, the management server 600 specifies a target vehicle within a predetermined range centered on the installation point of the charging stand 300 from the position information of the charging stand 300 of the request source. The management server 600 specifies, for example, all vehicles within the predetermined range as the target vehicles using the position information received from the vehicles as described above.

The management server 600 acquires information indicating the operating state of the wiper device of the specified target vehicle, and transmits the acquired information to the control device 308 of the charging stand 300 as the information indicating the operating state of the wiper device of the vehicle around the installation point of the charging stand 300.

Note that, it is preferable that the predetermined range include, for example, an area in a direction in which rainfall can be easily predicted (for example, upwind, etc.) based on the installation point. Further, it is preferable that the management server 600 specify a vehicle included in at least the area in the direction within the predetermined range as the target vehicle. The predetermined range may be set by the management server 600 or the control device 308 depending on the wind direction or the like at the installation point that can be acquired from the weather information.

In S104, the control device 308 determines whether rainfall of the predetermined rainfall amount or more is predicted. As the rainfall of the predetermined rainfall amount or more, for example, the rainfall with a large rainfall amount per unit time due to a sudden heavy downpour or a typhoon is assumed. The rainfall of the predetermined rainfall amount or more may mean the rainfall amount in which the rainfall amount per unit time is the predetermined rainfall amount or more, or the rainfall amount in which the total amount of rainfall amounts from an arbitrary time is the predetermined rainfall amount or more. Therefore, the control device 308 determines that rainfall of the predetermined rainfall amount or more is predicted when, for example, the wiper device of at least one vehicle around the installation point of the charging stand 300 is operating in the high-speed mode. When the control device 308 determines that rainfall of the predetermined rainfall amount or more is predicted (YES in S104), the process proceeds to S106.

In S106, the control device 308 executes the elevating control. The control device 308 controls the elevating device 306 such that the movable portion 300a is elevated to a position corresponding to the second state. At this time, the control device 308 sets the above-mentioned elevating flag to the ON state. When the control device 308 determines that the charging stand 300 is not in the first state (NO in S100), or when the control device 308 determines that rainfall of the predetermined rainfall amount or more is not predicted (NO in S104), this process is terminated.

An example of the operation of the control device 308 in the present embodiment based on the above structure and the flowchart will be described.

For example, it is assumed that the management server 600 receives the position information and the information indicating the operating state of the wiper device from the vehicle traveling around the installation point of the charging stand 300 at predetermined intervals, and stores the received information in the storage device 602.

When the charging stand 300 is in the first state (YES in S100), the information indicating the operating state of the wiper device of the vehicle around the installation point of the charging stand 300 is acquired from the management server 600 (S102). When the wiper device of any of the vehicles around the charging stand 300 is operating in the high-speed mode, the control device 308 determines that rainfall of the predetermined rainfall amount or more is predicted (YES in S104), and executes the elevating control (S106).

With this process, the elevating device 306 is controlled such that the charging stand 300 is in the second state. Therefore, even when rainfall of which rainfall amount is large occurs due to a sudden heavy downpour or a typhoon at the installation point and water enters the recess in which the charging stand 300 is installed, submersion of the charging stand 300 is suppressed.

As described above, with the charging stand 300 that is the charging facility according to the present embodiment, when the rainfall amount equal to or more than the predetermined rainfall amount is predicted at the installation point of the charging stand 300, the elevating device 306 is controlled such that the charging stand 300 is in the second state. Therefore, even when rainfall of which rainfall amount is large such as a sudden heavy downpour or a typhoon occurs, submersion of the charging stand can be suppressed. Therefore, a charging facility and a control method of the charging facility that suppress submersion due to rainfall can be provided.

Hereinafter, modifications will be described.
In the above-described embodiment, the power source 350 has been described as an AC power supply. However, the power source 350 may be a DC power supply. In this case, the electrified vehicle 200 may have a configuration in which the charger 212 is omitted, for example.

Further, in the above-described embodiment, the configuration in which the connector 302 is stored in the storage space above the movable portion 300a has been described as an example. However, for example, a socket may be provided to be exposed on the upper side surface of the movable portion 300a. With this configuration, the user can charge the battery 214 mounted on the electrified vehicle 200 by connecting the socket of the charging stand 300 to the inlet 220 of the electrified vehicle 200 using a separately prepared charging cable. Alternatively, a terminal portion connectable to an inlet provided on the bottom surface of the electrified vehicle 200 may be provided on the upper portion of the movable portion 300a. With this configuration, the inlet of the electrified vehicle 200 and the charging stand are electrically connected to each other when the movable portion 300a is in the second state. Therefore, the user can charge the battery 214 mounted on the electrified vehicle 200 without connecting the inlet of the electrified vehicle 200 and the charging stand.

Further, in the above-described embodiment, the case where the housing of the charging stand 300 has a cylindrical shape has been described as an example. However, the shape of the housing is not particularly limited to the cylindrical shape, as long as the shape of the housing has a shape that allows elevating and lowering movements. For example, the housing of the charging stand 300 may have a rectangular shape.

Further, the case where the management server 600 can communicate with a vehicle having the same configuration as the electrified vehicle 200 has been described as an example. However, the vehicle communicable with the management server 600 is not particularly limited to an electrified vehicle, as long as the vehicle is a vehicle that can transmit the position information and the information indicating the operating state of the wiper device to the management server 600.

Further, in the above-described embodiment, the control device 308 determines that rainfall of the predetermined rainfall amount or more is predicted when the wiper device of at least one vehicle around the installation point of the charging stand 300 is operating in the high-speed mode. However, the determination that rainfall of the predetermined rainfall amount or more is predicted is not particularly limited to the case above.

The control device 308 may determine that rainfall of the predetermined rainfall amount or more is predicted when, for example, the number of vehicles in which the wiper device is operating in the high-speed mode or in the low-speed mode around the installation point of the charging stand 300 is equal to or more than a threshold value. Alternatively, the control device 308 may determine that rainfall of the predetermined rainfall amount or more is predicted when, for example, the wiper device of any of the vehicles around the installation point of the charging stand 300 is operating in the high-speed mode or in the low-speed mode.

Further, in the above-described embodiment, it has been described that the information indicating the operating state of the wiper device of the vehicle around the installation point of the charging stand 300 is acquired as the information related to rainfall at the installation point of the charging stand 300. However, the information is not limited to the information described above, as long as rainfall of the predetermined rainfall amount or more can be predicted at the installation point.

For example, information indicating the detection result of the rainwater sensor of the vehicle around the installation point of the charging stand 300 may be acquired as the information related to rainfall at the installation point of the charging stand 300.

Figure 7:
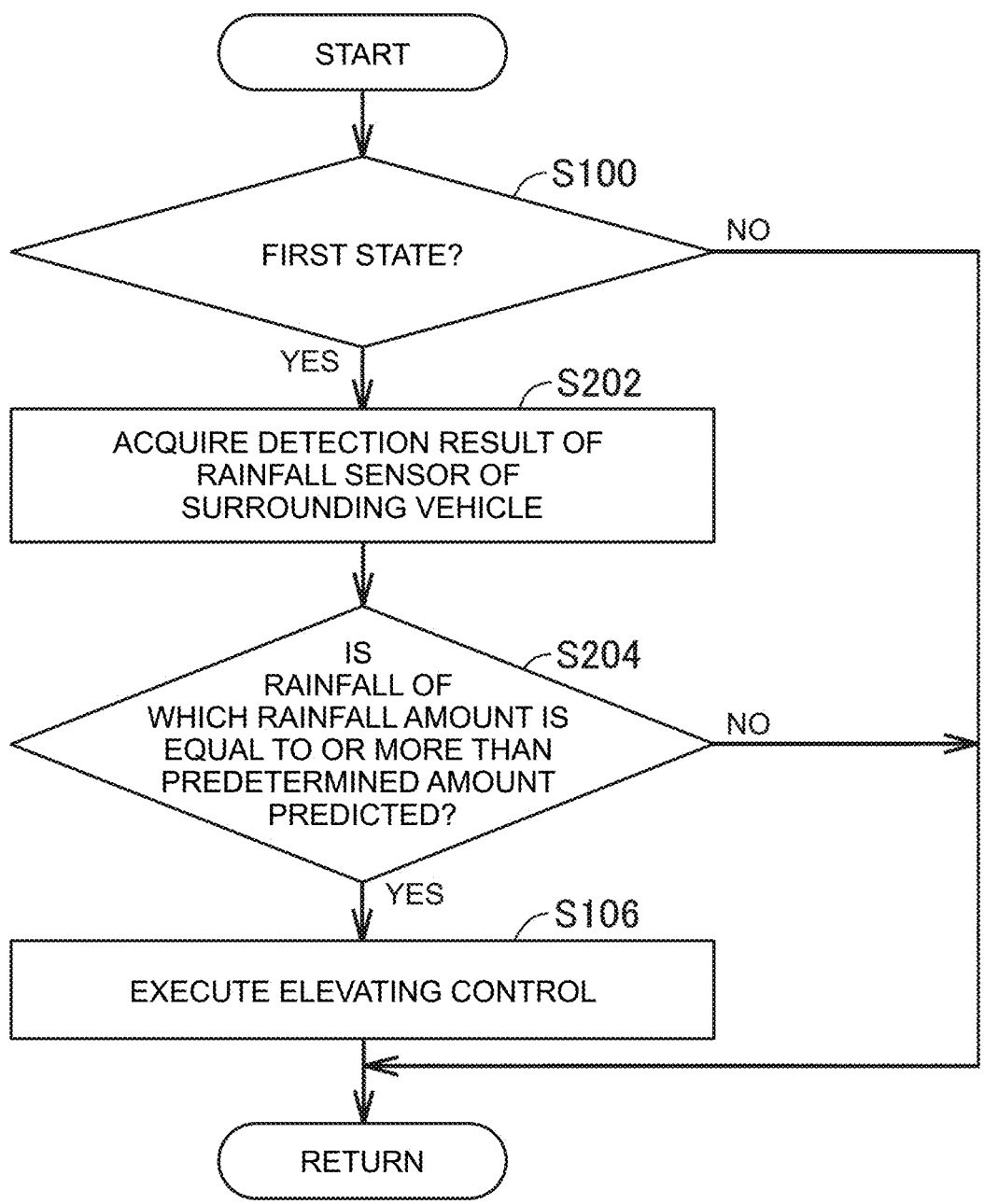
FIG. 7 is a flowchart showing an example of a process executed by the control device in a modification.

FIG. 7 is a flowchart showing an example of a process executed by the control device 308 in the modification.

The flowchart in FIG. 7 is different from the flowchart in FIG. 6 in that a process in S202 and a process in S204 are executed instead of the process in S102 and the process in S104. The other processes are the same as the processes shown in the flowchart in FIG. 6, except for the cases described below, and the same step numbers are assigned. Therefore, detailed explanations thereof will not be repeated.

When the control device 308 determines that the charging stand 300 is in the first state (YES in S100), the process proceeds to S202. In S202, the control device 308 acquires the detection result of the rainwater sensor of the surrounding vehicle. The control device 308 requests, for example, the management server 600 for information indicating the detection result of the rainwater sensor of the vehicle around the installation point of the charging stand 300.

When the management server 600 receives the request from the charging stand 300, the management server 600 specifies the target vehicle within the predetermined range centered on the installation point of the charging stand 300 from the position information of the charging stand 300 of the request source. The management server 600 specifies, for example, all vehicles within the predetermined range as the target vehicles using the position information received from the vehicles as described above.

The management server 600 acquires information indicating the detection result of the rainwater sensor of the specified target vehicle, and transmits the acquired information to the control device 308 of the charging stand 300 as the information indicating the detection result of the rainwater sensor of the vehicle around the installation point of the charging stand 300.

In S204, the control device 308 determines whether rainfall of the predetermined rainfall amount or more is predicted. The control device 308 determines that rainfall of the predetermined rainfall amount or more is predicted when, for example, the rainfall amount detected by the rainwater sensor of at least one vehicle around the installation point of the charging stand 300 is the predetermined amount or more. When the control device 308 determines that rainfall of the predetermined rainfall amount or more is predicted (YES in S204), the process proceeds to S106. When the control device 308 determines that rainfall of the predetermined rainfall amount or more is not predicted (NO in S204), this process is terminated.

An example of the operation of the control device 308 in the modification based on the above flowchart will be described.

For example, it is assumed that the management server 600 receives the position information and the information indicating the detection result of the rainwater sensor from the vehicle traveling around the installation point of the charging stand 300 at predetermined intervals, and stores the received information in the storage device 602.

When the charging stand 300 is in the first state (YES in S100), the information indicating the detection result of the rainwater sensor of the vehicle around the installation point of the charging stand 300 is acquired from the management server 600 (S202). When the rainfall amount detected by the rainwater sensor of any of the vehicles around the charging stand 300 is the predetermined amount or more, the control device 308 determines that rainfall of the predetermined rainfall amount or more is predicted (YES in S204), and executes the elevating control (S106).

Also with this process, the elevating device 306 is controlled such that the charging stand 300 is in the second state. Therefore, even when rainfall of which rainfall amount is large occurs due to a sudden heavy downpour or a typhoon at the installation point and water enters the recess in which the charging stand 300 is installed, submersion of the charging stand 300 is suppressed.

Further, in the above-described embodiment, it has been described that the information indicating the operating state of the wiper device of the vehicle around the installation point of the charging stand 300 is acquired as the information related to rainfall at the installation point of the charging stand 300. However, for example, the weather information around the installation point of the charging stand 300 may be directly acquired from the external server of the Japan Meteorological Agency, the weather information around the installation point of the charging stand 300 may be acquired from the Internet site that provides the rainfall status, or information on whether it is raining or information on the rainfall amount may be acquired from a mobile terminal moving around the charging stand 300 and the other charging stands. The control device 308 may determine whether rainfall of the predetermined rainfall amount or more is predicted at the installation point of the charging stand 300 using the acquired information.

Further, in the above-described embodiment, it has been described that the information indicating the operating state of the wiper device of the vehicle around the installation point of the charging stand 300 is acquired as the information related to rainfall at the installation point of the charging stand 300. However, information on the water level in the recess may be acquired as the information related to rainfall at the installation point of the charging stand 300. The control device 308 may determine that rainfall of the predetermined rainfall amount or more is predicted at the installation point of the charging stand 300 when the water level exceeds a threshold value.

Further, in the above-described embodiment, it has been described that the control device 308 controls the elevating device 306 such that the charging stand 300 is in the second state when the control device 308 determines that rainfall of the predetermined rainfall amount or more is predicted. However, in addition to that the elevating device 306 is controlled such that the charging stand 300 is in the second state, the control device 308 may transmit the elevating request such that another charging stand 300 adjacent to or around the charging stand 300 is in the second state. For example, as shown in FIGS. 3 and 4, when the control device 308 of any of the charging stands 300 determines that rainfall is predicted, the control device 308 may transmit the elevating request such that other two charging stands 300 are in the second state while the control device 308 controls the elevating device 306 such that the charging stand 300 is in the second state.

Figure 8:
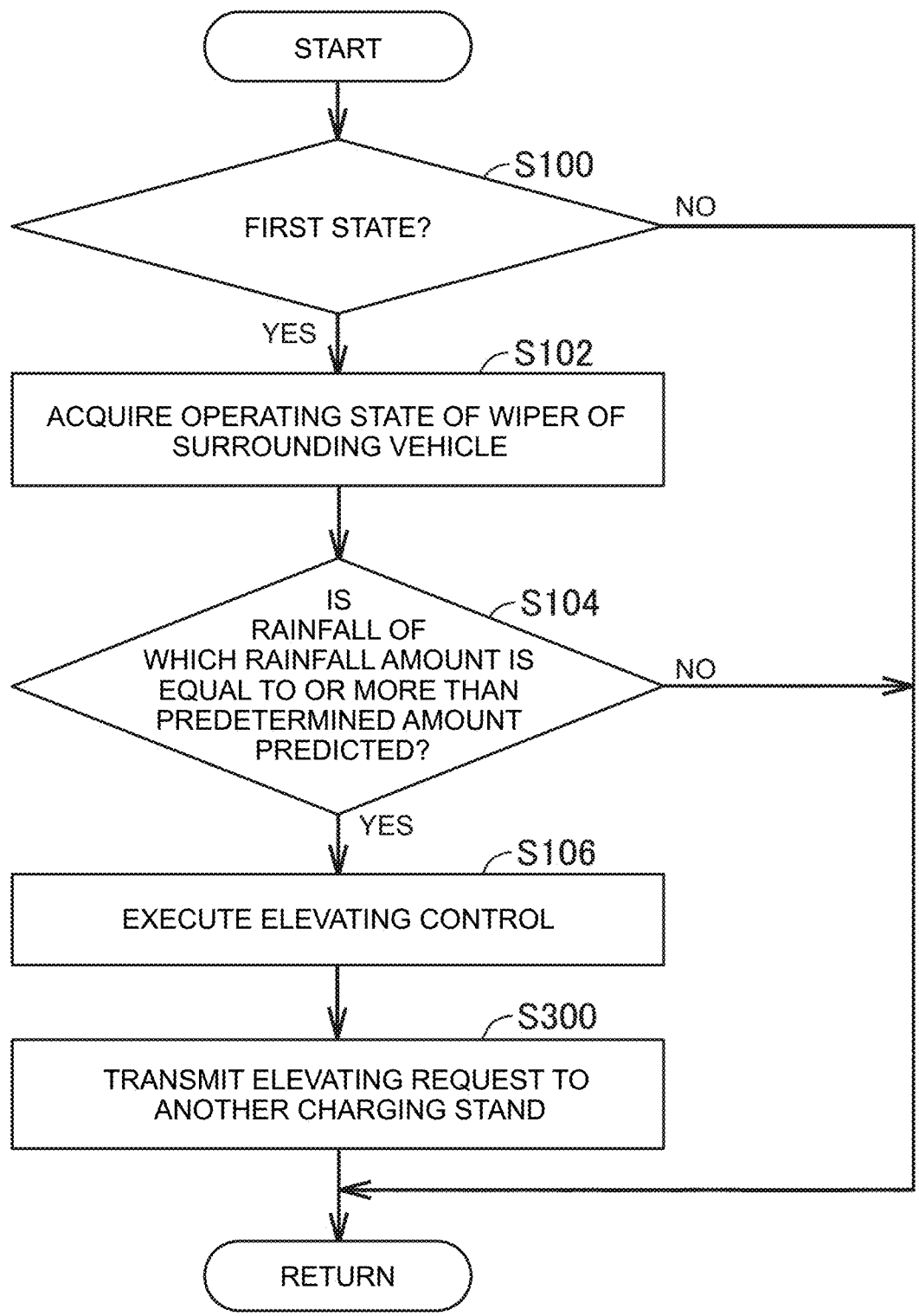
FIG. 8 is a flowchart showing an example of a process executed by the control device in another modification.

FIG. 8 is a flowchart showing an example of a process executed by the control device 308 in another modification.

The flowchart in FIG. 8 is different from the flowchart in FIG. 6 in that a process in S300 is executed after the process in S106. The other processes are the same as the processes shown in the flowchart in FIG. 6, and the same step numbers are assigned. Therefore, detailed explanations thereof will not be repeated.

In S300, the control device 308 transmits the elevating request to another charging stand 300 such that the other charging stand 300 is in the second state. The other charging stand 300 to which the elevating request is transmitted may be the adjacent charging stand 300 or the charging stand 300 within a predetermined range.

With this configuration, in addition to the charging stand 300 at the installation point, submersion of the other charging stand 300 adjacent to or around the charging stand 300 can be suppressed.

Further, in the above-described embodiment, it has been described that the control device 308 acquires the information indicating the operating state of the wiper device of the vehicle around the installation point of the charging stand 300 via the management server 600. However, the control device 308 may acquire the information directly from the vehicle around the installation point.

In addition, the above-mentioned modifications may be carried out by appropriately combining all or a part thereof. The embodiment disclosed herein should be considered to be exemplary and not restrictive in all respects. The scope of the present disclosure is shown by the scope of claims rather than the description above, and is intended to include all modifications within the meaning and the scope equivalent to the scope of claims.

What is claimed is:

1. A movable charging facility that is installed in a recess provided on a ground and is able to charge a power storage device mounted on a vehicle, the charging facility comprising:
    a movable portion including a connecting device that is connectable to the power storage device;
    an elevating device that elevates and lowers the movable portion such that any of a plurality of states is established, the states including a first state in which the movable portion is stored underground and a second state in which the movable portion is exposed on the ground;
    an information acquisition device that acquires information related to rainfall at an installation point of the charging facility; and
    a control device that controls an operation of the elevating device, wherein the control device controls the elevating device such that the second state is established when a rainfall amount is predicted to be equal to or more than a predetermined amount at the installation point using the information;
    wherein the information acquisition device acquires information on an operating state of a wiper device of the vehicle within a predetermined range centered on the installation point.

2. The charging facility according to claim 1, wherein the information acquisition device acquires information indicating a detection result by a rainwater sensor of the vehicle within a predetermined range centered on the installation point.

3. The charging facility according to claim 1, wherein the control device controls the elevating device such that the second state is established and requests another charging facility for elevating the movable portion of the other charging facility, when the rainfall amount is predicted to be equal to or more than the predetermined amount at the installation point using the information.

4. A control method of a movable charging facility that is installed in a recess provided on a ground and is able to charge a power storage device mounted on a vehicle, the charging facility including a movable portion including a connecting device that is connectable to the power storage device, and an elevating device that elevates and lowers the movable portion such that any of a plurality of states is established, the states including a first state in which the movable portion is stored underground and a second state in which the movable portion is exposed on the ground, the control method comprising:
    a step of acquiring information related to rainfall at an installation point of the charging facility; and
    a step of controlling the elevating device such that the second state is established when a rainfall amount is predicted to be equal to or more than a predetermined amount at the installation point using the information; and
    wherein the step of acquiring acquires information on an operating state of a wiper device of the vehicle within a predetermined range centered on the installation point.

* * * * *